United States Patent [19]

Rainis

[11] Patent Number: 4,599,321
[45] Date of Patent: Jul. 8, 1986

[54] PROCESS FOR THE MANUFACTURE OF SPHERICAL BODIES BY SELECTIVE AGGLOMERATION

[75] Inventor: Andrew Rainis, Walnut Creek, Calif.

[73] Assignee: Chevron Research Company, San Francisco, Calif.

[21] Appl. No.: 691,645

[22] Filed: Jan. 15, 1985

[51] Int. Cl.$^4$ .............................................. B01J 35/08
[52] U.S. Cl. ......................................... 502/8; 502/439
[58] Field of Search ..................................... 502/8, 439

[56] References Cited

U.S. PATENT DOCUMENTS

| 2,474,911 | 7/1949 | Pierce et al. | 502/8 |
| 3,296,151 | 1/1967 | Heinze et al. | 502/8 |
| 3,515,684 | 6/1970 | McEvoy | 502/8 |
| 4,507,396 | 3/1985 | Hickson | 502/8 |

Primary Examiner—W. J. Shine
Attorney, Agent, or Firm—Burns, Doane, Swecker & Mathis

[57] ABSTRACT

This invention relates to the preparation of small substantially spherical solid catalysts. More particularly, the process produces strong solid substantially spherical agglomerates comprising inorganic materials, which process comprises:

(a) mixing at high speed a portion of an inorganic material in the form of hydrophilic micron-sized particles in a water-immiscible liquid thereby forming a dispersion;

(b) gradually adding to the dispersion an aqueous phase while containing the high speed mixing until substantially spherical microagglomerates form within the water-immiscible liquid;

(c) subjecting the microagglomerates to agitation in a vessel having a hydrophobic inner surface at a speed low enough to achieve substantially uniformly sized spherical agglomerates;

(d) drying the agglomerates to produce hardened substantially spherical uniformly sized agglomerates; and (e) optionally further separating the agglomerates by size. Optionally, the aqueous phase in step (b) may include the soluble salts of catalytic metals, acids and bases and/or colloidal-sized inorganic particles. These spherical particles have diameters generally between 1 to 5 millimeters and are useful as catalysts, or catalyst supports, where the catalytic components are subsequently deposited on the support.

23 Claims, 1 Drawing Figure

PROCESS FOR THE MANUFACTURE OF SPHERICAL BODIES BY SELECTIVE AGGLOMERATION

FIELD OF THE INVENTION

This invention relates to the field of small spherical solid body or particle preparation. More particularly, it concerns a process for forming spherical solid bodies useful as absorbents, catalysts any catalyst supports useful in chemical processes, via agglomeration of a suspension of solid particles. This process produces substantially spherical bodies or particles having a small substantially uniform diameter in a specified range.

BACKGROUND OF THE INVENTION

Related Art

A wide variety of solid inorganic bodies are prepared in the chemical process and related industries. The spherical shape is useful for such bodies because of its desirable properties, such as better packing, higher strength, less "fine" particles, and better flow characteristics to name a few. These spherical bodies find application primarily as catalysts, or as supports for catalysts, or as absorbents and the like.

A number of processes are known to form solid inorganic bodies. For instance, in U.S. Pat. No. 3,656,901, Kummerle discloses that silica/alumina and silica particles are gelled by adding drops of aqueous colloidal sodium silicate or colloidal silica alumina to a solvent, such as an alcohol, ether-alcohol or amine. However, this patent does not disclose a method of obtaining substantially spherical particles having a diameter in a specified range.

In U.S. Pat. No. 3,844,978, Hickson discloses a process wherein hydrothermal crystallization is conducted using an aqueous slurry of hydrous sols and salts. The slurry is subsequently dewatered and dried to give solids which are then ground to a desired size. This patent does not teach the formation of small substantially spherical agglomerates.

In U.S. patent application Ser. No. 524,197, filed Aug. 18, 1983, now U.S. Pat. No. 4,507,396, Hickson describes a method wherein micron-sized particles are dispersed in a nonaqueous medium and agglomerated by the addition of an aqueous phase in the presence of colloidal particles to give a plastic mass which is then extruded or otherwise formed into particulate bodies.

In U.S. Pat. No. 3,258,311, Burzynski et al. disclose a process for the formation of uniformly small spherical beads from alkali metal-silicates. The method comprises the steps of (1) combining the particle-forming ingredients comprising: (a) water; (b) a compound of the general formula $xR_2O \cdot ySiO_2$ where R is an alkali and the x/y ratio is greater than 0.24 (an x/y ratio of $R_2O/SiO_2$ which characterizes the water soluble sodium silicates, and also generally the other water soluble alkali silicates); (c) dilute strong aqueous acid; and (d) and emulsifying agent; and (2) agitating the resulting mixture. The beads are usually about 1 micron to 1.5 millimeters in diameter. This process is disadvantageous because when it is used to make beads larger than 1.5 mm they are not uniform in size.

In U.S. Pat. No. 3,140,251, Plank et al. disclose the formation of spheroids by dispersing an aluminosilicate in a hydrosol, which is obtained by reacting an alkali metal silicate with an acid or an alkaline coagulant. The hydrosol may be dispersed through a nozzle into a bath of oil or other water-immiscible suspending medium to obtain spheroidally shaped bead particles of catalyst. However, the uniformly small size of the agglomerate cannot be controlled, and with high agitation the colloidal solution would form an emulsion.

In U.S. Pat. No. 3,296,151, Heinze et al. disclose a process in which solid zeolite particles are wetted with water, mixed with a binder and kneaded into a paste which is extruded or otherwise shaped and dried. Heinze et al. also disclose other agglomeration processes, including a process in which an aqueous sol is dripped into a water-immiscible liquid where the sol gels as it falls through a column of liquid. In both cases, spherical zeolite molecular sieves are produced, which have an undisclosed diameter or range of sizes.

In U.S. Pat. No. 3,515,684, McEvoy discloses the formation of fluidizable cracking catalyst particles. A dispersion of finely divided plastic particles of kaolin in water are intensely agitated in an oil to agglomerate the particles to provide a size distribution of the order of 15 to 150 microns in diameter suitable for catalysts for fluidized cracking. A disadvantage of this process appears to be that it is limited to producing particles having a diameter of 15 to 150 microns.

In U.S. Pat. No. 4,013,587, Fischer et al. disclose a process for preparing alumina-containing particles which comprise the steps of: (a) mixing an aluminum hydroxide hydrosol with a high molecular weight natural organic material to form a mixture; (b) introducing the mixture in dispersed form into a water-immiscible liquid to form gel particles at elevated temperatures; (c) aging the particles in the liquid and then in aqueous ammonia; (d) recovering the particles; and (e) calcining the particles. The disadvantages of this process include the use of elevated temperatures, and use of aqueous ammonia which can be hazardous.

In U.S. Pat. No. 2,474,911, Pierce et al. teach the preparation of micro-spherical gel particles in a continuous manner. A sol is introduced into a water-immiscible liquid such as an oil containing an emulsifier. The zone of turbulence is only at the bottom of a mixing column and the flow rate of the oil in the column is maintained to achieve continuous flow of the gel droplets. Pierce et al. does not teach the obtaining of spherical particles having a diameter of 1–5 mm.

A few additional U.S. patents are of interest. In U.S. Pat. No. 2,384,946 Marisic discloses the formation of generally spherical hydrogel pellets. The pellets are obtained by spraying the hydrogel through an orifice into a gaseous or liquid medium.

In U.S. Pat. No. 2,900,349, Schwartz discloses the preparation of inorganic oxide gels which have high resistance to attrition. In one embodiment, Schwartz describes the preparation of hydrogel spheroids by allowing the gel to fall or rise slowly through a column of hydrocarbon solvent.

In U.S. Pat. No. 3,004,929, Lucas et al. disclose a process for the preparation and extrusion of silica-alumina catalyst supports. The catalyst supports obtained are usually pellets which are not uniformly spherical or in the size range described in the present invention.

In Australian Pat. No. 127,250, Kimberlin et al. disclose the production of finely divided gel particles which may be employed for catalytic adsorption and other purposes. The size is reported to be controlled by preparing inorganic gels in minute particles by emulsifying a hydrosol as the internal phase of a water-immiscible liquid, agitating the emulsion to prevent separation of the phases until the hydrosol is set and separating the gel particles. The disadvantage of the process is that the particles are of the order of 60-100 microns and thus are much smaller than the particles described herein.

Tauster in the *Journal of Catalysis*, Vol. 18, No. 3, pp 358-360 (1980) discloses a process for impregnating the pores of particles with a metal salt by suspending them in a water-immiscible liquid, such as a hydrocarbon, and titrating the liquid with an aqueous solution of metal salt.

C. E. Capes in "Agglomeration in Liquid Media" in the text *Particle Size Enlargement*, published by Elsevier Scientific Publishing Company, Amsterdam, the Netherlands, 1980, reviews a variety of applications of water-immiscible media in particle-forming processes. However, none of the processes disclosed by Capes, describe the steps or spherical product having a uniform diameter of about 1 to 5 mm as described herein.

In the *Canadian Journal of Chemical Engineering*, Vol. 47, pp 166-170 (1969), A. F. Sirianni et al. discuss a number of processes whereby finely divided solids in liquid suspension are agglomerated. The solids obtained may be separated as spherical bodies without regard to a substantially uniform size.

Additional sources of background information on agglomeration include "Agglomeration: Growing Larger in Applications and Technology" by J. E. Browing in *Chemical Engineering*, pp 147-170 (Dec. 4, 1967); H. M. Smith and I. E. Puddington, *Can.J.Chem. Eng.*, Vol. 38, 1916 (1960); J. R. Farrand, *Can.J.Chem. Eng.*, Vol. 39, 94 (1961); and J. P. Sutherland, *Can.J. Chem.Eng.*, Vol. 40, 268 (1962).

All of the art processes described hereinabove are not without some shortcomings. For one, it is often difficult to vary the composition and size of the solid body. Further, the products of these processes are often fine powders or chips having mechanical properties which may be unacceptable under the conditions of use. The present invention provides a method for forming small spherical solid inorganic bodies which are particularly useful as catalysts and catalyst supports. The spherical shape provides additional strength, reduces breakage, improves packing, and the like. These spheres have an average uniform diameter of between about 1 to 5 mm.

SUMMARY OF THE INVENTION

In one aspect, the present invention concerns a process for producing solid substantially uniformly sized spherical agglomerates of substantially inorganic material. In this case a single component solid is used and the process comprises:

(a) mixing at high speed a portion of an inorganic material in the form of hydrophilic micron-sized particles in a water-immiscible liquid thereby forming a dispersion;

(b) gradually adding to the dispersion an aqueous phase while continuing high speed mixing until substantially spherical micro-agglomerates form within the water-immiscible phase;

(c) then subjecting the microagglomerates to agitation at a mixing speed low enough to achieve substantially uniformly sized spherical agglomerates about 1 to 5 mm in diameter;

(d) separating the agglomerates obtained from the water-immiscible solvent; and (e) drying the agglomerates to produce hardened substantially spherical uniformly sized agglomerates. Optionally, the process may also incorporate in step (b) in the aqueous phase, about 0.1 to 70% by weight of a soluble metal salt, in which case the metal salt is incorporated into the agglomerates. The final agglomerates are generally uniformly sized between about 1 to 5 mm in diameter.

In another aspect the present invention concerns a process for producing substantially spherical agglomerates based on two or more solid components. In this case, the two solid components are combined and the process comprises:

(a) agitating at high speed a liquid reaction mixture which comprises a water-immiscible solvent and hydrophilic inorganic particles to form a dispersion;

(b) continuing to agitate at high speed the reaction mixture while gradually adding an aqueous phase containing colloidal-sized inorganic particles;

(c) then subjecting the product of step (b) to low speed mixing to produce substantially spherical uniformly sized agglomerates;

(d) isolating the agglomerates of step (c) from the solvent; and (e) drying the agglomerates to produce hardened substantially spherical uniformly sized agglomerates. Optionally, this process may also include in step (b) an aqueous phase which contains about 0.1 to 70% by weight of a soluble metal salt. The final agglomerates obtained are generally uniformly sized between about 1 to 5 mm in diameter.

In another aspect the present invention concerns a continuous process for producing substantially spherical agglomerates. This process combines three or more components at the same time rather than sequentially, and the process comprises:

(a) agitating in a high speed continuous mixer a reaction mixture which itself comprises:
  (i) a water-immiscible liquid;
  (ii) hydrophilic micron-sized inorganic particles; and
  (iii) an aqueous phase containing colloidal-sized inorganic particles and optionally other additives such as metal salts, acids, bases and the like.

(b) conveying the product of step (a) to a low speed mixer to produce substantially spherical uniformly sized agglomerates;

(c) separating the agglomerates of step (b) from the solvent; and (d) drying the agglomerates to produce hardened substantially spherical sized agglomerates.

The spherical bodies are useful as catalysts, catalyst supports or bases, absorbents, and the like.

DEFINITIONS

As used herein:

"Agglomerate" or "agglomeration" refers to a product (or a technique) that combines a finely powdered material to form larger particles which are held together by a variety of physical-chemical forces.

"Water-immiscible liquid" refers to liquids such as hydrocarbons, fluorocarbons, halocarbons and mixtures thereof, which are soluble in water to an extent of not greater than about 1.0% by weight. Preferred water-immiscible liquids for use herein have a boiling point between about 25° C. and 100° C. The liquids do not dissolve or otherwise harm the hydrophobic materials lining the mixers or tubing of particular sections of the apparatus used in this invention.

"Hydrocarbon" or "hydrocarbon liquid" refers to a liquid hydrocarbon having a boiling point (bp) of about 35° to 100° C. It includes, for example, pentane, pentene, hexane, hexene, cyclohexane, heptane, heptene, petroleum ether of bp 30° to 60° C., petroleum ether of bp 50° to 80° C., petroleum distillate fractions of between about 50° to 100° C., and the like. Hydrocarbon includes straight, branched and cyclic structures of these compounds and mixtures thereof.

"Fluorocarbon" refers to the group of commercially available liquid straight, branched or cyclic aliphatic compounds wherein one or more of the protons have been replaced by fluorine. Usually an additional one or more protons has been replaced by chlorine or bromine. These liquids include, for example, bromofluoromethane, 1,2-dichlorohexafluorocyclobutane, 1,1,2-trichloro-1,2,2-trifluoroethane, 1-bromo-1,2-dichloro-1,2,2-trifluoroethane, 1-fluoro-1,2,2-trichloroethane and the like. The boiling points of these liquids range from about 35° C. to 100° C. Because of diminished hydrogen bonding, removal of these liquids from the agglomerates is more easily accomplished by heating than with hydrocarbon liquids.

"Halocarbon" refers to liquids such as straight, branched or cyclic aliphatic compounds wherein one or more of the protons have been replaced by a chlorine or bromine atom. These liquids include methylene chloride, chloroform, carbon tetrachloride, ethylene dichloride, bromochloromethane, and the like. The boiling points of these liquids range from about 35° C. to 100° C. Because of diminished hydrogen bonding, removal of these liquids is more easily accomplished by heating than with hydrocarbon liquids.

"Zeolite" includes natural and synthetic materials of hydrous, tectosilicate minerals characterized by having an aluminosilicate tetrahedral framework, controlled porosity, ion-exchangeable large cations, and loosely held water molecules permitting reversible dehydration. Examples of hydrated aluminum and calcium silicates include $CaO \cdot 2Al_2O_3 \cdot 5SiO_2$ or $Na_2O \cdot 2Al_2O_3 \cdot 5SiO_2$. Some water of hydration is usually present. These materials are extremely useful alone or with a catalyst support in refining and reforming of petroleum. Zeolite includes but is not limited to the natural zeolites such as erionite, chabazite, active analcites, gmelenite and mordenite, and includes as well the multitude of synthetic or modified crystalline zeolites such as are referred to in the trade as ZSM-11 described in U.S. Pat. No. 3,709,979; ZSM-5 and ZSM-8 described in U.S. Pat. No. 3,755,145; zeolites A, X, Y, L, D, R, S, T described in U.S. Pat. No. 3,013,990 and patents cited therein, CZH-5 zeolite as described in U.S. Pat. No. 4,360,419; ZSM-43 as described in U.S. Pat. No. 4,209,499; ZSM-34 as described in U.S. Pat. No. 4,086,186; and ZSM-39 as described in U.S. Pat. No. 4,287,166. These zeolites are intended to be descriptive, and the patents listed above are incorporated herein by reference.

DETAILED DESCRIPTION OF THE PREFERRED EMBODIMENTS OF THE INVENTION

Figure 1:
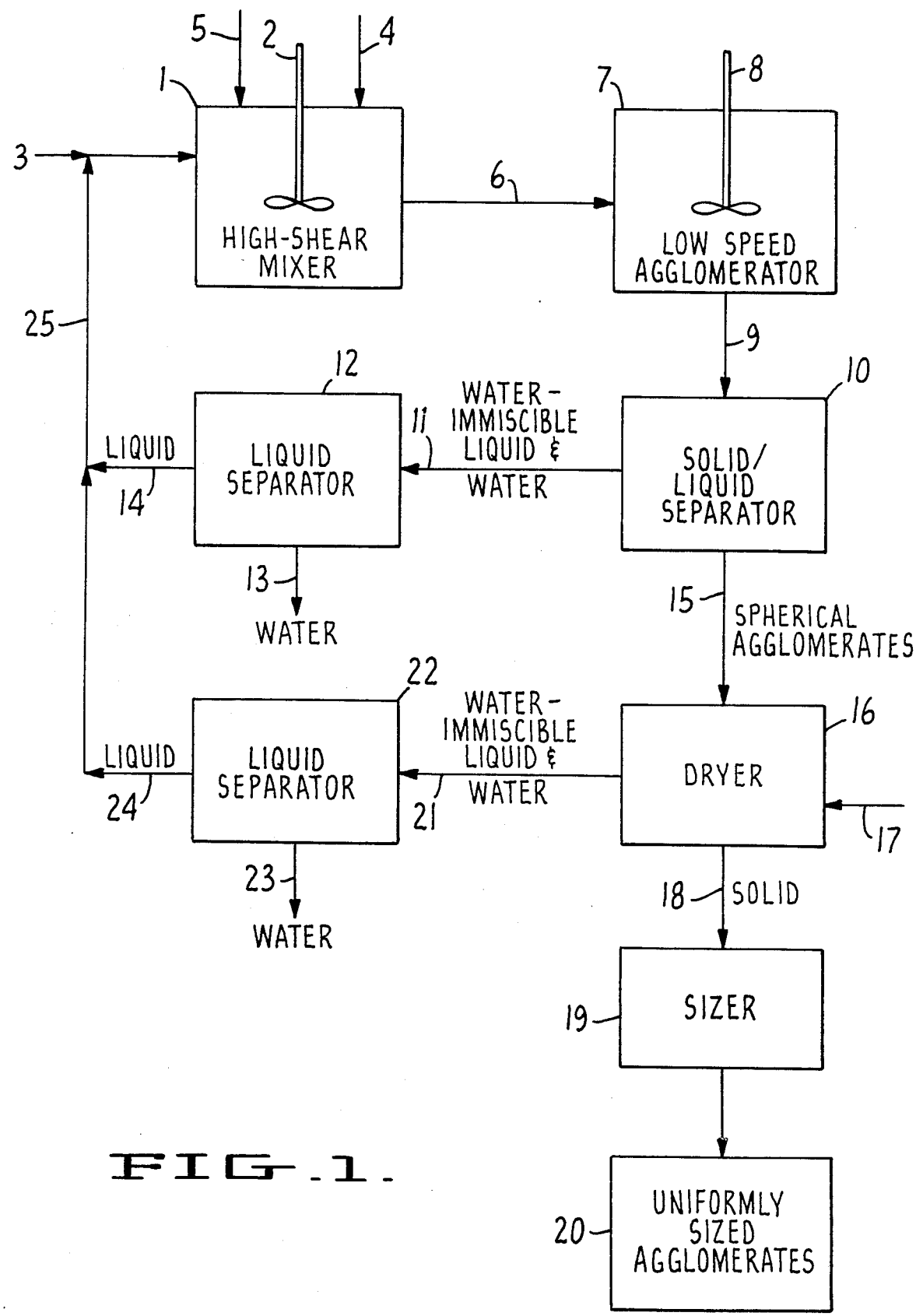
FIG. 1 is a schematic representation of the various operations of mixing, dispersing, agglomerating, separating, drying and recycling of solvent in accordance with the present invention.

Referring now to FIG. 1, vessel 1, usually a high speed mixer, (preferably a colloid mill (CHARLOTTE), such as is manufactured by Chemicolloid Laboratories, Inc. of 55 Herricks Road, Garden City, N.Y. 11040) is used for the high speed-high shear mixing to perform the required dispersion of the particles, emulsification of the aqueous phase and formation of microagglomerates. Vessel 1 is fitted with a high speed stirring means (e.g., stirrer) 2, or may have equivalent means of achieving the necessary high-shear mixing. Other high speed mixers (dispersers) in the art include those manufactured by Myers Engineering, Inc., 8376 Salt Lake Avenue, Bell, CA 90201, and homogenizer mixers by Greerco Corporation, Executive Drive, Hudson, N.H. 03051.

In a preferred embodiment for the continuous production of spherical catalyst and/or adsorbents, mixing vessel 1 is a high shear mixer, such as a colloid mill. The speed of the mixer is usually between about 2500 and 4000 revolutions per minute (rpm), preferably about 2800 to 3000 rpm so as to produce a dispersion of microagglomerates. The shear speed (or edge speed) can be calculated for these stirrers by knowing the diameters of the stirrers or mixers. Thus, for a stirrer having a 6 inch blade, about 2500 to 4000 rpm corresponds to an edge speed of about 66.6 to 106.6 feet per second, and 2800 to 3000 rpm corresponds to about 74.6 to 80 feet per second.

The water-immiscible liquid from line 3 (makeup liquid) and line 25 (recycle liquid) is fed continuously into vessel 1. The water-immiscible liquid may include hydrocarbons, fluorocarbons and halocarbons as are defined herein. Preferred liquids include the fluorocarbons, specifically the fluoroalkanes and fluorohaloalkanes having a boiling point of about 35° to 100° C. The fluorinated liquids have an added advantage because of their high specific gravity. The agglomerates float on the surface and are easily removed from the liquid by surface scooping and the like. Also, the high vapor pressure of the fluorocarbons and the lack of hydrogen bonding facilitate the removal of the solvent during the drying process. 1,1,2-Trichloro-1,2,2-trifluoroethane and/or 1,2-dibromo-1,1,2,2-tetrafluoroethane is particularly useful as a liquid medium.

Inorganic materials, such as hydrophilic micron-sized particles, and the aqueous phase are also fed continuously and simultaneously into vessel 1 through lines 5 and 4. The high shear mixer produces microagglomerates comprising the inorganic materials and the aqueous phase. Residence times of the microagglomerates in vessel 1 are usually between about 0.1 and 300 seconds, depending upon the materials involved. Desirably, the microagglomerates at this stage are less than 200 microns (0.2 mm) in diameter. Inorganic salts or reagents may be added to the aqueous phase to enhance the catalytic activity of the finished product, e.g. salts of Pt, Pd, Ni, Co, Mo, Sn, W, Rh, Re and the like; acids such as nitric, sulfuric, acetic, citric, bases such as sodium hydroxide, ammonia, organic amines and the like. Alternatively, colloidal-sized inorganic particles can also be mixed with the aqueous phase and also fed into vessel 1. In this manner, an intimitate mixture of inorganic catalyst components (alumina, silica, zeolites), catalytic metals and chemical modifiers is produced by the high shear mixing.

The relative quantities of water-immiscible liquid, hydrophilic micron-sized particles, colloidal-sized inorganic particles, and aqueous solution are those sufficient to obtain the described agglomeration. The hydrophilic micron-sized particles are usually of the order of about 1 to 25 percent by weight in the water-immiscible liquid. The ratios of the hydrophilic micron-sized inorganic particles to the colloidal-sized particles may range from about 1 to 5 to about 5 to 1. Preferably, the ratios are between about 2 to 1 to about 1 to 2.

In the continuous process, the dispersion of microagglomerates is then conveyed by line 6 to vessel 7. Vessel 7, a low speed mixer, is usually baffled. It contains a stirrer 8, or equivalent means, to mix the particles at a speed sufficiently low that the particles will grow or agglomerate to form spherical agglomerates of a substantially uniform size of about 1 to 5 mm in diameter, preferably about 2 to 4 millimeters in diameter. In a preferred embodiment, line 6, vessel 7, and stirrer 8 are lined or coated with a hydrophobic material. These materials usually take the form of a hydrophobic plastic such as polyalkenes (i.e. polyethylene, polypropylene, polystyrene, polyvinylchloride, polycarbonates, poly(methylmethacrylate), TEFLON, VITON ®, etc. Polyethylene and TEFLON are particularly preferred materials. Attempts to perform the present agglomeration in a glass or metal (i.e. stainless steel) mixing vessel results in the inorganic hydrogel "smearing" over the inner surface of the mixing vessel causing plugging and other operational difficulties.

Mixer 8 of low speed agglomerator 7 has a speed of about 250 to 500 rpm, preferably about 300 to 400 rpm. Again, the edge speed of the mixer can be calculated. Thus, for instance using a 6 inch impeller (mixer), the edge speed for about 250 to 500 rpm corresponds to about 6.6 to 13.3 feet per second, and about 300 to 400 rpm corresponds to about 8 to 10.6 feet per second. The residence time of the dispersion in this low speed agglomerator may be from about 1 minute to 30 minutes, depending upon the desired final properties of the agglomerates. A residence time of about 5 to 10 minutes is preferred to form the agglomerates described herein. Generally speaking, higher speeds of 350 to 500 rpm and lower residence times (less than about 5 minutes) during the agglomeration in vessel 7 will produce smaller agglomerates, of the order of 1 to 3 mm in diameter. Generally, lower speeds of the order of 250 rpm and longer residence times will produce agglomerates of the order of 2 to 4 mm in diameter.

Alternatively in batch processing, the function of vessel 1 and vessel 7 may be combined in one vessel having hydrophobic inner surfaces, as described above, such that the speed is varied from high to low over time to achieve substantially the same result as is obtained with the two vessels. Also, in batch processing all reagents and liquids can be added sequentially and in any order to the same vessel to obtain substantially the same result as with the two vessels in the continuous process described above. The agglomerates after the low speed agglomeration whether continuous or batch are next conveyed to the solid-liquid separator 10 via line 9. It is preferred that the line 9 and the separator (or screen) have hydrophobic surface as is described above. The agglomerates then do not smear and are not destroyed on the separator.

After the separation of the agglomerates from the liquid phase in separator 10, the separated water-immiscible liquid (or solvent) and any residual water are conveyed through line 11 to the water/liquid separation vessel 12. The water is removed via line 13 and the water-immiscible liquid is conveyed through lines 14 and 25 to be recycled into vessel 1. This liquid may be dried to meet the requirements for moisture for reuse in the agglomeration process.

The separated spherical agglomerates (which are usually about 1 to 5 mm or larger in diameter, but preferably are from about 2 to 4 mm, depending upon the agglomeration conditions) with most of the solvent removed are then conveyed via line 15 to a dryer 16. The dryer is usually an industrial belt dryer but equivalent means may be used. Line 17 is optionally available to provide a source of air or inert gas through the dryer to facilitate the removal of the solvent and water. The dried spherical agglomerates are then conveyed using line 18 to a sizer 19 which separates the dried agglomerates into narrower size ranges, if necessary. Useful size ranges are between about 1 to 5 mm, preferably about 2 to 4 mm. The agglomerates are collected and may be calcined at elevated temperatures to remove additional volatile materials before use as catalysts or catalyst supports.

In a similar manner to the separation described above, the separated water-immiscible liquid and water are transmitted through line 21 to the liquid separator vessel 22. The separated water is removed via line 23 and the water-immiscible liquid is conveyed through lines 24 and 25 to be recycled into vessel 1. This liquid may be dried to meet the requirements for moisture for reuse in the agglomeration process.

PREFERRED EMBODIMENTS

Embodiments of the present invention include the preparation of spherical agglomerates wherein after drying, the agglomerates have a generally uniform diameter of about 2 to 4 millimeters. An additional subgroup of embodiments includes the preparation of those agglomerates which comprise a single material such as zeolite, silica and alumina. These single component materials may be subsequently impregnated by metals and the like, by methods known in the art to produce active catalysts.

Preferred embodiments of the preparation of single component agglomerates include the process where the high speed mixing is between about 2500 and 4000 revolutions per minute, and also where the low speed mixing is between about 200 to 400 revolutions per minute. For a batch process, these two speeds may occur sequentially in the same vessel.

An additional preferred embodiment of the preparation of single component agglomerates is where the water-immiscible liquid is a fluorocarbon solvent, particularly 1,1,2-trichloro-1,2,2-trifluoroethane.

Additional embodiments of the present invention include forming spherical agglomerates of two different inorganic materials, wherein after removal of the agglomerates from the separator (separator 10 of FIG. 1), the diameter of the uncured agglomerates is about 2 to 4 millimeters.

An additional embodiment of the present invention includes forming spherical agglomerates of at least two components such as micron-sized particles of zeolite and colloidal-sized particles of silica, or alumina preferably in a weight ratio of zeolite to silica or alumina between about 40:60 and 60:40.

An additional embodiment includes forming two or more component agglomerates where the high speed mixing is between about 2500 and 4000 revolutions per minute, (or its equivalent) and the low speed mixing is between about 200 to 400 revolutions per minute or its equivalent. For the two component agglomerates, an additional preferred embodiment of the process is the use of a fluorocarbon as a water-immiscible liquid (or solvent), specifically 1,2-dibromo-1,1,2,2-tetrafluoroethane.

More preferred embodiments include the single and multiple component agglomerates described above where the high speed mixing is between about 2700 and 3500 rpm and the low speed agglomeration occurs at between 250 and 350 rpm. Edge speeds for a 6 inch impeller blade are calculated as is described hereinabove.

In the practice of one embodiment of the present invention, the non-colloidal particles such as a micron-sized zeolite are first suspended in the water-immiscible liquid and then agglomerated with an aqueous phase by gradually adding water which includes colloidal or subcolloidal size particles. Thus, three avenues are provided for introducing materials to be incorporated into the final solid agglomerate. These include: (1) the material or a precursor of the material can be present in the suspended non-colloidal solid particles; (2) the material or a precursor is present as the colloidal particle; or (3) the material may be present in the aqueous phase as sol particles or one or more completely dissolved chemicals. Alternatively, once the solid spherical products have been formed, art-known methods, such as impregnation, vapor deposition or the like may be employed to deposit additional materials in or on the solid bodies.

The relative amounts of hydrated non-colloidal (micron-sized) particles and colloidal particles may be controlled. The exact ratio of the two types of particles will depend in part on the product being produced. Usually, there is at least 5-10% by weight of each type. That is, the ratio may vary between about 95:5 and 5:95 weight percent, or preferably between about 40:60 and 60:40 weight percent, more preferably about 65:35 and 35:65 weight percent.

This invention is further described by the following Examples which are provided to illustrate the invention and are not to be construed as limiting the invention's scope.

EXAMPLE 1

Spherical Catalyst of Zeolite-Silica (a) Potassium L-type zeolite powder, (crystal size 0.5 to 1 $\mu M$) is dispersed in 1000 ml of 1,1,2-trichloro-1,2,2-trifluoroethane using a POLYTRON (Brinkman Instruments, Model PT 10/35) high speed mixer. The reaction vessel is a 2-1 polypropylene container. A fumed silica (Cab-O-Sil, particle size about 20 $\mu M$) is added and dispersed uniformly with the zeolite. An aqueous solution of "Ludox" colloidal silica sol (30.1 weight %=$SiO_2$) and water is slowly added dropwise to the dispersion until microagglomerates are formed. The speed of the POLYTRON mixer is about 3000 revolutions per minute. The predetermined solid portion is about 53% of the total, with 65 weight percent zeolite and 35 percent $SiO_2$ (half as Cab-O-Sil, half as Ludox). The reaction mixture is transferred to the low speed mixer and container, in which all exposed inner surfaces are of polypropylene, and stirred for 4 min at a speed of 300 revolutions per minute to obtain substantially spherical uniformly sized small agglomerates. The agglomerates are separated from the solvent and have a diameter of about 2 to 4 mm.

The particles are then vacuum dried (dryer 16) for 16 hr at 110° C. for the material to set before calcining for 10 hr at 1000° F. in dry air. The dried agglomerate particles of 2 to 4 millimeters in diameter obtained are sized using standard sieves, and readily withstand additional ion-exchange conditions with potassium solutions and impregnation processing steps to provide the small, substantially spherical finished agglomerates (catalyst).

(b) 1,1,2-Trichloro-1,2,2-trifluoroethane may be substituted by other water-immiscible liquids in this preparation. Therefore, proceeding as described in Subpart (a) above of this Example but substituting a volumetrically equivalent amount of pentane;
pentene;
cyclohexane;
hexane;
heptane;
heptene;
octane;
pentane/heptane (50/50 by volume);
petroleum ether, bp 30°–60° C.;
petroleum ether, bp 50°–80° C.;
methylene chloride;
chloroform;
ethylene dichloride;
1,1,2-trichloro-1,2,2-trifluoroethane;
1-bromo-1,2-dichloro-1,2,2-difluorohexane;
pentane/chloroform (50/50 by volume); or
octane/1,1,2-trichloro-1,2,2-trifluoroethane (50/50 by volume) or mixtures thereof for 1,1,2-trichloro-1,2,2-trifluoroethane, there are obtained the corresponding small, substantially spherical agglomerates of zeolite/silica, which when dried are useful as catalysts.

(c) The potassium L-type zeolite powder (microsized particles) may be substituted by other materials, primarily zeolites, in this invention. Therefore, proceeding as is described in Subpart (a) above of this Example, but substituting a stoichiometrically equivalent amount of Zeolite A;
Zeolite D;
Zeolite R;
Zeolite S;
Zeolite T;
Zeolite X;
Zeolite Y;
ZSM-5;
ZSM-8;
ZSM-11;
ZSM-43;
ZSM-34;
ZSM-39;
CZH-5;

or mixtures thereof for Zeolite L, there are obtained the corresponding small, substantially spherical agglomerates of zeolite/silica, which when dried are useful as catalysts.

(d) The final silica and/or silica sol (colloidal-sized particles) may be substituted by other materials. Therefore, proceeding as is described in Subpart (a) above of this Example but substituting a stoichiometrically equivalent amount of colloidal sized $Al_2O_3$;
$SiO_2$;
$TiO_2$;
$ZrO_2$;
Attagel 50;
$TiO_2$-$Al_2O_3$;
$TiO_2$-$SiO_2$;
$SiO_2$-$Al_2O_3$ for both the fumed silica and colloidal silica sol, there are obtained the corresponding agglomerates of potassium L-type zeolite/colloidal material which when sieved and dried are useful as catalysts.

(c) It is possible to make other substitutions for the solvent, the micron-sized particles (zeolite) and the sol (colloidal-sized) particles to obtain substantially spherical uniformly sized agglomerates in accordance with this invention. Therefore, proceeding as is described in Subpart (a) above of this Example but substituting a volumetrically equivalent amount of any solvent or mixture of solvents described in Subpart (b) above of this Example for 1,1,2-trichloro-1,2,2-trifluoroethane and substituting a volumetrically equivalent amount of any zeolite or a mixture of zeolites described in Subpart (c) above of this Example for Zeolite L and a volumetrically equivalent amount of colloidal sized particles described in Subpart (d) above of this Example for the colloidal silica sol, there is obtained the corresponding agglomeration of zeolite/colloidal particles, which when dried are useful as catalysts. Representative examples include but are not limited to the following:

Zeolite X on $Al_2O_3$ from heptane;
Zeolite Y on $SiO_2$ from chloroform;
ZSM-8 on $SiO_2$ from chloroform; or
ZSM-39 on Attagel 50 from 1,2-dibromo-1,1,2,2-tetrafluoroethane.

EXAMPLE 2

A Single Solid System (a) A commercial grade of pseudo boehmite (Catapal 0.1 to 1 $\mu M$) 30 g is dispersed in 250 ml of 1,2-dibromo-1,1,2,2-tetrafluoroethane using a POLYTRON high speed mixer. To this dispersion is added dropwise 15.5 g of an aqueous solution of 1.0M nitric acid, and 1.0M ammonium nitrate. The mixing speed of the vessel is 3000 revolutions per minute. The reaction mass is then subjected to low speed mixing in the same vessel at 300 revolutions per minute to obtain substantially spherical small agglomerates. The solvent is removed by filtration, and the agglomerates are then dried in a vacuum oven at 110° C. for 2 hr.

The dried spherical agglomerates have an average diameter of 3 to 5 mm.

(b) 1,1,2-Trichloro-1,2,2,-trifluoroethane may be substituted by other water-immiscible solvents in this preparation. Therefore, proceeding as described in Subpart (a) above of this Example but substituting volumetrically equivalent amount of pentane;
pentene;
cyclohexane;
hexane;
heptane;
heptene;
octane;
pentane/heptane (50/50 by volume);
petroleum ether, bp 30°–60° C.;
petroleum ether, bp 50°–80° C.;
methylene chloride;
chloroform;
ethylene dichloride;

water-immiscible liquid is 1,2-dibromo-1,1,2,2-tetrafluoroethane.

TABLE 1

AGGLOMERATE PRODUCTION[a]

| Ex. No. | COMPONENTS MICRO-AGGLOMERATE/SOL | MICRO-AGGLOMERATE HIGH SPEED (Rpm) | AGGLOMERATION LOW SPEED (Rpm) | TIME (min) | SIZE DIST. (mm) |
|---|---|---|---|---|---|
| 5. | ZEOLITE L/ | 2500–2700 | 250–270 | 10 | 3–5 |
| 6. | ZEOLITE L/ | 3800–4000 | 460–500 | 3 | 1–3 |
| 4. | ZEOLITE L/ | 3100–3300 | 300–320 | 5 | 2–4 |
| 8. | ZEOLITE A/ SiO$_2$ | 2800–3000 | 250–280 | 10 | 2–5 |
| 9. | ZEOLITE A/ Al$_2$O$_3$ | 2500–2700 | 380–400 | 10 | 2–4 |
| 10. | ZEOLITE T/ TiO$_2$ | 3800–4000 | 480–500 | 3 | 1–3 |
| 11. | ZEOLITE L/ SiO$_2$ | 3500–3800 | 280–320 | 5 | 2–4 |

[a]SOLVENT 1,2-Dibromo-1,1,2,2-tetrafluoroethane

While only a few embodiments of the invention have been shown and described herein, it will become apparent to those skilled in the art that various modifications and changes can be made in the process to prepare small spherical agglomerated catalysts without departing from the spirit and scope of the present invention. All such modifications and changes coming within the scope of the appended claims are intended to be covered thereby.

What is claimed is:

1. A process for producing solid substantially spherical agglomerates of substantially inorganic material, which process comprises:
   (a) mixing at high speed a portion of an inorganic material in the form of hydrophilic micron-sized particles in a water-immiscible liquid thereby forming a dispersion;
   (b) gradually adding to said dispersion an aqueous phase while continuing said high speed mixing until substantially spherical hydrous micro-agglomerates form within said water immiscible liquid;
   (c) subjecting said micro-agglomerates in a vessel having a hydrophobic inner surface to agitation at a speed low enough to achieve uniformly sized substantially spherical agglomerates;
   (d) separating said agglomerates obtained from said water-immiscible liquid; and
   (e) drying said agglomerates to produce hardened uniformly sized substantially spherical agglomerates having a diameter of between about 1 and 5 mm.

2. The process of claim 1 wherein in step (b) said aqueous phase contains about 0.1 to 70% by weight of soluble metal salt.

3. The process of claim 1 wherein in step (e) the size of said agglomerates is beween about 2 to 4 millimeters.

4. The process of claim 1 wherein the inorganic particles comprise zeolite.

5. The process of claim 1 wherein the inorganic particles comprise silica.

6. The process of claim 1 wherein the inorganic particles comprise alumina.

7. The process of claim 1 wherein the high speed mixing in steps (a) and (b) is between about 2500 and 4000 revolutions per minute.

8. The process of claim 1 wherein the low speed mixing in step (c) is between about 200 to 400 revolutions per minute.

9. The process of claim 1 wherein said water-immiscible liquid is a fluorocarbon.

10. The process of claim 9 wherein said fluorocarbon is 1,1,2-trichloro-1,2,2-trifluoroethane.

11. A process for producing substantially spherical agglomerates, which process comprises:
   (a) agitating at high speed a liquid reaction mixture which comprises a water immiscible liquid and hydrophilic micron-sized inorganic particles to form a dispersion;
   (b) continuing to agitate at high speed said reaction mixture while adding slowly dropwise an aqueous phase containing colloidal-sized inorganic particles;
   (c) then subjecting the product of step (b) in a vessel having a hydrophobic inner surface to low speed mixing to produce substantially spherical uniformly sized agglomerates;
   (d) isolating said agglomerates of step (c) from the liquid phase; and
   (e) drying said agglomerates to produce hardened substantially spherical uniformly sized agglomerates having a diameter of between about 1 and 5 mm.

12. The process of claim 11 wherein in step (b) said aqueous phase contains about 0.1 to 70% by weight of a soluble metal salt.

13. The process of claim 11 wherein in step (e) the diameter of the hardened agglomerates is between about 2 to 4 mm.

14. The process of claim 13 wherein the mircon-sized particles are zeolite and the colloidal particles are silica.

15. The process of claim 14 wherein the weight ratio of zeolite to silica is between about 40:60 and 60:40.

16. The process of claim 13 wherein the micron-sized particles are zeolite and the colloidal particles are alumina.

17. The process of claim 16 wherein the weight ratio of zeolite to alumina is about 40:60 to 60:40.

18. The process of claim 11 wherein the high speed mixing is between about 2500 and 4000 revolutions per minute.

19. The process of claim 11 wherein the low speed mixing is between about 200 and 400 revolutions per minute.

20. The process of claim 11 wherein said water-immiscible liquid is a fluorocarbon.

21. The process of claim 20 wherein said fluorocarbon is 1,2-dibromo-1,1,2,2-tetrafluoroethane.

22. The process of claim 21 which further includes:
   (f) separating said agglomerates of step (e) size.

23. A continuous sequential process for producing substantially spherical agglomerates, which process comprises:

1,1,2-trichloro-1,2,2-trifluoroethane;
1-bromo-1,2-dichloro-1,2,2-difluorohexane;
pentane/chloroform (50/50 by volume); or
octane/1,1,2-trichloro-1,2,2-trifluoroethane (50/50 by volume) or mixtures thereof for 1,1,2-trichloro-1,2,2-trifluoroethane, there are obtained the corresponding small, substantially spherical agglomerates of alumina, which when dried are useful as catalyst bases.

(c) The nitric acid may be substituted by other acids or bases. Therefore, proceeding as described in Subpart (a) above of this Example but substituting a stoichiometrically equivalent amount of $HClO_4$;
$H_2SO_4$;
HF;
HBr;
HI or mixtures thereof for nitric acid, there are obtained the corresponding agglomerates, which when sieved and dried are useful as catalyst bases.

(d) It is possible to make other substitutions for the solvent, the micron-sized particles and the nitric acid to obtain substantially spherical uniformly sized agglomerates in accordance with this invention. Therefore, proceeding as is described in Subpart (a) above of this Example but substituting a stoichiometrically equivalent of any solvent or mixture of solvents described in Subpart (b) above of this Example for 1,1,2-trichloro-1,2,2-trifluoroethane, and an equivalent amount of acid or base described in Subpart (c) above of this Example for nitric acid, there are obtained the corresponding agglomerates of alumina, which when dried have diameters between 1 and 5 mm and are useful as catalyst bases. Representative examples include but are not limited to the following:

Zeolite X with sulfuric acid from heptane;
Zeolite Y with hydrogen fluoride from chloroform;
ZSM-8 with perchloric acid from chloroform; or
ZSM-39 with ammonium nitrate and nitric acid from 1,1,2-trichloro-1,2,2-trifluoroethane.

EXAMPLE 3

Continuous Agglomeration Process

A suspension of 10-weight percent Catapal in 1,2-dibromo-1,1,2,2-tetrafluoroethane is pumped from an agitated storage tank at 100 ml per minute, through a static mixer (Kenix quarter inch static mixer having 21 elements). Simultaneously, an aqueous solution containing 1M nitric acid and 1M ammonium nitrate is also pumped through this mixer at 11 ml per minute. This premixes the Catapal with the aqueous phase so that the dispersion entering the high shear mixer is of constant composition. The high shear mixer is a high speed laboratory blender modified for continuous operation. The vertically mounted mixing chamber is constructed from a 4-in diameter by 5-in long stainless steel pipe closed at both ends with ⅛ inch stainless steel plates. The bottom plate is fitted with the blender blade assembly. The feed inlet is in the side of the cylindrical wall, 0.5 in from the plate. This arrangement ensures that the feed is injected directly into the high shear zone in the vicinity of the rotating blade, the operating speed of which is 3000 rpm. The outlet is located in the center of the top flange and is connected to the adjacent low speed agglomerator by a short length of quarter inch ID TEFLON tubing The horizontally mounted low speed agglomerator is constructed from a 4-in diameter by 12-in long stainless steel pipe. The ends are sealed with ⅛ in stainless steel flanges which house both shaft seals and externally mounted bearings. The impeller is a 0.5 in diameter shaft through which are inserted four sets of evenly spaced pegs, 0.25 in diameter and 3 in long. These pegs provide the agitation necessary for successful agglomeration. Power to the low speed agglomerator is provided by a quarter horsepower DC motor. The speed of rotation is adjustable from 50 to 1800 rpm. With the Catapal/nitric acid/ammonium nitrate system, the speed for optimum agglomeration is 300 rpm. All internal surfaces are coated with a 1 millimeter thick fluoropolymer coating (Fluoroshield Coatings, W. L. Gore and Associates). The inlet in the low speed agglomerator is at the bottom of the cylindrical chamber, 1-in from the end flange nearest the motor. The inlet diameter is 0.25 in. The outlet for the agglomerates is at the other end of the cylindrical chamber, also 1-in from the end flange. The outlet is a 1-in inner diameter by 3-in length of stainless steel tubing coated on the inside with a 0.5 millimeter layer of Fluoroshield. The outlet pipe is located on the upper surface of the cylindrical chamber and is inclined radially at 30 degrees from the vertical. This allows convenient discharge of the agglomerates and the organic liquid onto a coated separator screen. With this arrangement, spherical agglomerates at 2 to 4 millimeters in diameter are produced on a continuous basis. After vacuum drying for 2 hours at 100° C., the agglomerates are calcined at 950° F. for 4 hr in a stream of dry air to give hardened spheres resistent to crushing and suitable as a catalyst base.

EXAMPLE 4

Comparative Example (a) In a 1-quart polyethylene bottle are added 270 g of hexane, 10 g of water and 30 g of alumina. Upon addition of the alumina, shaking produces a mixture of spherical agglomerates ranging in size from 1 to 7 mm. The agglomerates appear to be resistant to fracture and deformation and must be sieved to narrow the size range of the agglomerates.

(b) Repeating Subpart (a) above of this Example, under identical conditions produced non-spherical agglomerates in the range of 1–20 mm. The procedure of this Example does not have the necessary degree of control to obtain the uniformly sized agglomerates of the present invention.

EXAMPLE 5–11

Agglomerate Production

Examples 5–11 describe embodiments of the present invention. Examples 5, 6 and 7 describe single component agglomerates. The Examples substantially follow the procedure described in Example 2(a). Examples 8, 9, 10 and 11 substantially follow Example 1 with the following changes. The mixing and agglomeration occurs in a single polyethylene lined vessel. Only the speed of the mixer is varied from high speed to low speed. The (a) agitating at high speed in a continuous mixer, a reaction mixture which itself comprises:
(i) a water-immiscible liquid;
(ii) hydrophilic micron-sized inorganic particles; and
(iii) an aqueous phase containing colloidal-sized inorganic particles;
(b) subjecting the product of step (a) in a different vessel having a hydrophobic inner surface to low speed mixing to produce substantially spherical uniformly sized agglomerates;
(c) separating the agglomerates of step (b) from the liquid; and
(d) drying said agglomerates to produce hardened substantially spherical sized agglomerates having a diameter of between about 1 and 5 mm.

* * * * *